(12) United States Patent
Mashimo (10) Patent No.: US 11,641,123 B2
(45) Date of Patent: May 2, 2023

(54) POWER SUPPLY SYSTEM FOR WATERCRAFT

(71) Applicant: YAMAHA HATSUDOKI KABUSHIKI KAISHA, Iwata (JP)

(72) Inventor: Masaaki Mashimo, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 3 days.

(21) Appl. No.: 17/568,880

(22) Filed: Jan. 5, 2022

(65) Prior Publication Data

US 2022/0247200 A1 Aug. 4, 2022

(30) Foreign Application Priority Data

Feb. 1, 2021 (JP) .............................. JP2021-014566

(51) Int. Cl.
*H02J 7/00* (2006.01)
*B60L 50/61* (2019.01)
(Continued)

(52) U.S. Cl.
CPC .......... *H02J 7/00712* (2020.01); *B60L 50/61* (2019.02); *B60L 58/12* (2019.02); *B63H 20/00* (2013.01); *H02J 7/0013* (2013.01); *H02J 7/0048* (2020.01); *H02J 7/0063* (2013.01); *H02J 7/14* (2013.01); *B63H 2020/003* (2013.01); *H02J 2310/42* (2020.01)

(58) Field of Classification Search
CPC .... H02J 7/00712; H02J 7/0013; H02J 7/0048; H02J 7/0063; H02J 7/14; H02J 2310/42; B60L 50/61; B60L 58/12; B63H 20/00; B63H 2020/003
See application file for complete search history.

(56) References Cited

U.S. PATENT DOCUMENTS 6,342,775 B1 * 1/2002 Sleder, Sr. ................ H02J 7/02
320/117
6,525,508 B1 2/2003 Kanno
(Continued)

FOREIGN PATENT DOCUMENTS

JP 6671223 B2 3/2020

OTHER PUBLICATIONS

"Battery Management Wiring Schematics for Typical Applications", Blue Sea Systems, Nov. 19, 2020, (Retrieved from the Internet: URL:https://web.archive.org/web/20201119195320/https://www.bluesea.com/resources/170/Battery_Management_Wiring_Schematics_for_Typical_Applications [retrieved on May 25, 2022]), pp. 1.

(Continued)

*Primary Examiner* — Lincoln D Donovan
*Assistant Examiner* — Alex W Lam
(74) *Attorney, Agent, or Firm* — Keating and Bennett, LLP (57) ABSTRACT

In a power supply system for a watercraft, a controller in a first state connects a first electric circuit to a third electric circuit to supply electric power from a first engine battery to an electric device, and disconnects a second electric circuit from the third electric circuit to charge a second engine battery by a second generator. In a second state, the controller connects the second electric circuit to the third electric circuit to supply the electric power from the second engine battery to the electric device, and disconnects the first electric circuit from the third electric circuit to charge the first engine battery by a first generator.

20 Claims, 12 Drawing Sheets

(51) Int. Cl.
*B60L 58/12* (2019.01)
*B63H 20/00* (2006.01)
*H02J 7/14* (2006.01)

(56) References Cited

U.S. PATENT DOCUMENTS

| | | | | |
|---|---|---|---|---|
| 2010/0033130 A1* | 2/2010 | Mizushima | ............ | B63H 23/24 |
| | | | | 320/126 |
| 2010/0049385 A1* | 2/2010 | Bamba | ................... | B63H 21/22 |
| | | | | 701/21 |
| 2017/0291672 A1 | 10/2017 | Maejima | | |
| 2018/0241225 A1* | 8/2018 | Shirai | ................ | G01R 31/3842 |

OTHER PUBLICATIONS

Official Communication issued in corresponding European Patent Application No. 21213122.1, dated Jun. 8, 2022.

* cited by examiner

| No. | REMAINING BATTERY POWER | | | CONNECTION STATE |
|---|---|---|---|---|
| | M1 | M2 | H1 | |
| 1 | Lv1 | Lv1 | – | S3 |
| 2 | Lv1 | Lv2 | – | S1 |
| 3 | Lv1 | Lv3 | – | S4 |
| 4 | Lv2 | Lv1 | – | S2 |
| 5 | Lv3 | Lv1 | – | S4 |
| 6 | Lv2 | Lv2 | – | S4 |
| 7 | Lv2 | Lv3 | – | S4 |
| 8 | Lv3 | Lv2 | – | S4 |
| 9 | Lv3 | Lv3 | Lv1 | S3 |
| 10 | Lv3 | Lv3 | Lv2 | S3 |
| 11 | Lv3 | Lv3 | Lv3 | S5 |

POWER SUPPLY SYSTEM FOR WATERCRAFT

CROSS REFERENCE TO RELATED APPLICATIONS

This application claims the benefit of priority to Japanese Patent Application No. 2021-014566 filed on Feb. 1, 2021. The entire contents of this application are hereby incorporated herein by reference.

BACKGROUND OF THE INVENTION

1. Field of the Invention

The present invention relates to a power supply system for a watercraft.

2. Description of the Related Art

Some watercrafts are equipped with a battery for a marine propulsion device and a battery for electric devices. The marine propulsion device includes an engine and a generator driven by the engine. The battery for the marine propulsion device is connected to the engine and the generator. The marine propulsion device is started by the electric power supplied from the battery for the marine propulsion device. In addition, the marine propulsion device charges the battery for the marine propulsion device by the generator. The battery for the electric devices supplies the electric power to the electric devices mounted on the watercraft.

Japanese Patent No. 6671223 discloses a power supply system for a watercraft that switches a connection between a battery for a marine propulsion device and a battery for electric devices. For example, when the engine is running, the battery for the marine propulsion device and the battery for the electric devices are connected to each other. As a result, the battery for the marine propulsion device and the battery for the electric devices are charged by the generator. Further, when the engine is stopped, the battery for the marine propulsion device and the battery for the electric devices are disconnected from each other.

In recent years, the amount of electric power used for electric devices in the watercraft has increased. Therefore, it is desired to supply more electric power from the battery for the marine propulsion device to the electric devices. However, if a large amount of electric power is used simultaneously in the marine propulsion device and the electric devices, the battery for the marine propulsion device may run out of charge and no longer provide power.

SUMMARY OF THE INVENTION

Preferred embodiments of the present invention efficiently supply electric power to electric devices while preventing or significantly reducing battery exhaustion for marine propulsion devices.

A system according to a first preferred embodiment of the present invention is a power supply system for a watercraft. The watercraft includes a first outboard motor, a second outboard motor, and an electric device. The first outboard motor includes a first engine and a first generator driven by the first engine. The second outboard motor includes a second engine and a second generator driven by the second engine. The system includes a first engine battery, a second engine battery, a power supply battery, a first electric circuit, a second electric circuit, a third electric circuit, at least one switch, and a controller. The first engine battery supplies an electric power to the first engine and is charged by the first generator. The second engine battery supplies an electric power to the second engine and is charged by the second generator. The power supply battery supplies an electric power to the electric device. The first electric circuit connects the first engine battery and the first outboard motor. The second electric circuit connects the second engine battery and the second outboard motor. The third electric circuit connects the power supply battery and the electric device. The at least one switch switches a connection state between the first electric circuit, the second electric circuit, and the third electric circuit. The controller controls the at least one switch to switch the connection state to a plurality of states including at least one of a first state and a second state. In the first state, the controller connects the first electric circuit to the third electric circuit to supply the electric power from the first engine battery to the electric device, and disconnects the second electric circuit from the third electric circuit to charge the second engine battery by the generator. In the second state, the controller connects the second electric circuit to the third electric circuit to supply the electric power from the second engine battery to the electric device, and disconnects the first electric circuit from the third electric circuit to charge the first engine battery by the generator.

A system according to a second preferred embodiment of the present invention is a power supply system for a watercraft. The watercraft includes a first marine propulsion device, a second marine propulsion device, and an electric device. The first marine propulsion device includes a first engine and a first generator driven by the first engine. The second marine propulsion device includes a second engine and a second generator driven by the second engine. The system includes a first engine battery, a second engine battery, a power supply battery, a first electric circuit, a second electric circuit, a third electric circuit, at least one switch, and a controller. The first engine battery supplies an electric power to the first engine and is charged by the first generator. The second engine battery supplies an electric power to the second engine and is charged by the second generator. The power supply battery supplies an electric power to the electric device. The first electric circuit connects the first engine battery and the first marine propulsion device. The second electric circuit connects the second engine battery and the second marine propulsion device. The third electric circuit connects the power supply battery and the electric device. The at least one switch switches a connection state between the first electric circuit, the second electric circuit, and the third electric circuit.

The controller controls the at least one switch to switch the connection state to a plurality of states including at least one of a first state and a second state. In the first state, the controller connects the first electric circuit to the third electric circuit to supply the electric power from the first engine battery to the electric device, and disconnects the second electric circuit from the third electric circuit to charge the second engine battery by the generator. In the second state, the controller connects the second electric circuit to the third electric circuit to supply the electric power from the second engine battery to the electric device, and disconnects the first electric circuit from the third electric circuit to charge the first engine battery by the generator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
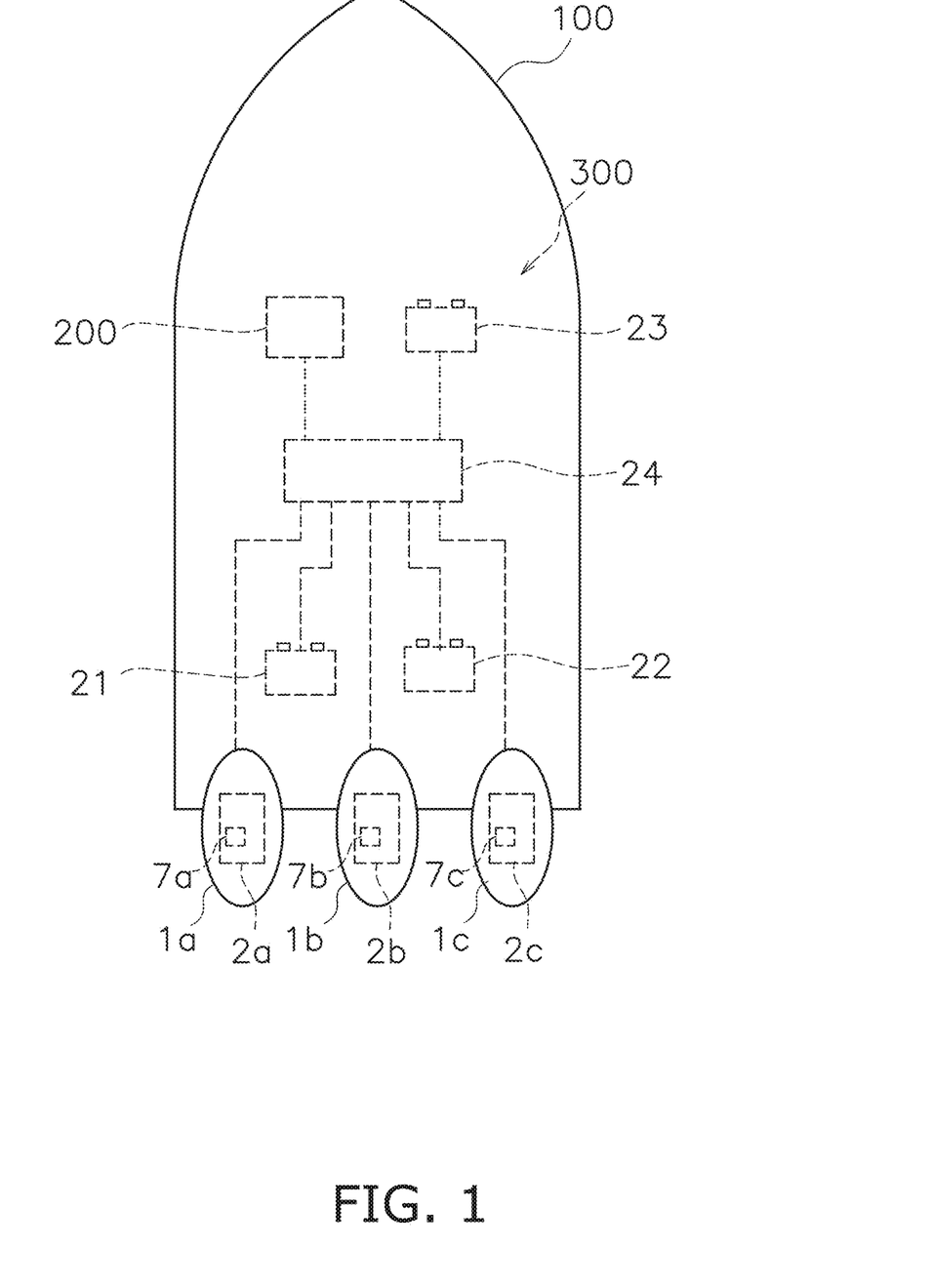
FIG. 1 is a schematic view showing a watercraft equipped with a power supply system according to a preferred embodiment of the present invention.

Hereinafter, preferred embodiments of the present invention will be described with reference to the drawings. FIG. 1 is a schematic view showing a watercraft 100 equipped with a power supply system according to a preferred embodiment of the present invention. The watercraft 100 includes a plurality of marine propulsion devices 1a to 1c. In the present preferred embodiment, the marine propulsion devices 1a to 1c are outboard motors. The marine propulsion devices 1a to 1c are attached to the stern of the watercraft 100. The marine propulsion devices 1a to 1c generate thrusts to propel the watercraft 100. The plurality of marine propulsion devices 1a to 1c include a first marine propulsion device 1a, a second marine propulsion device 1b, and a third marine propulsion device 1c.

Figure 2:
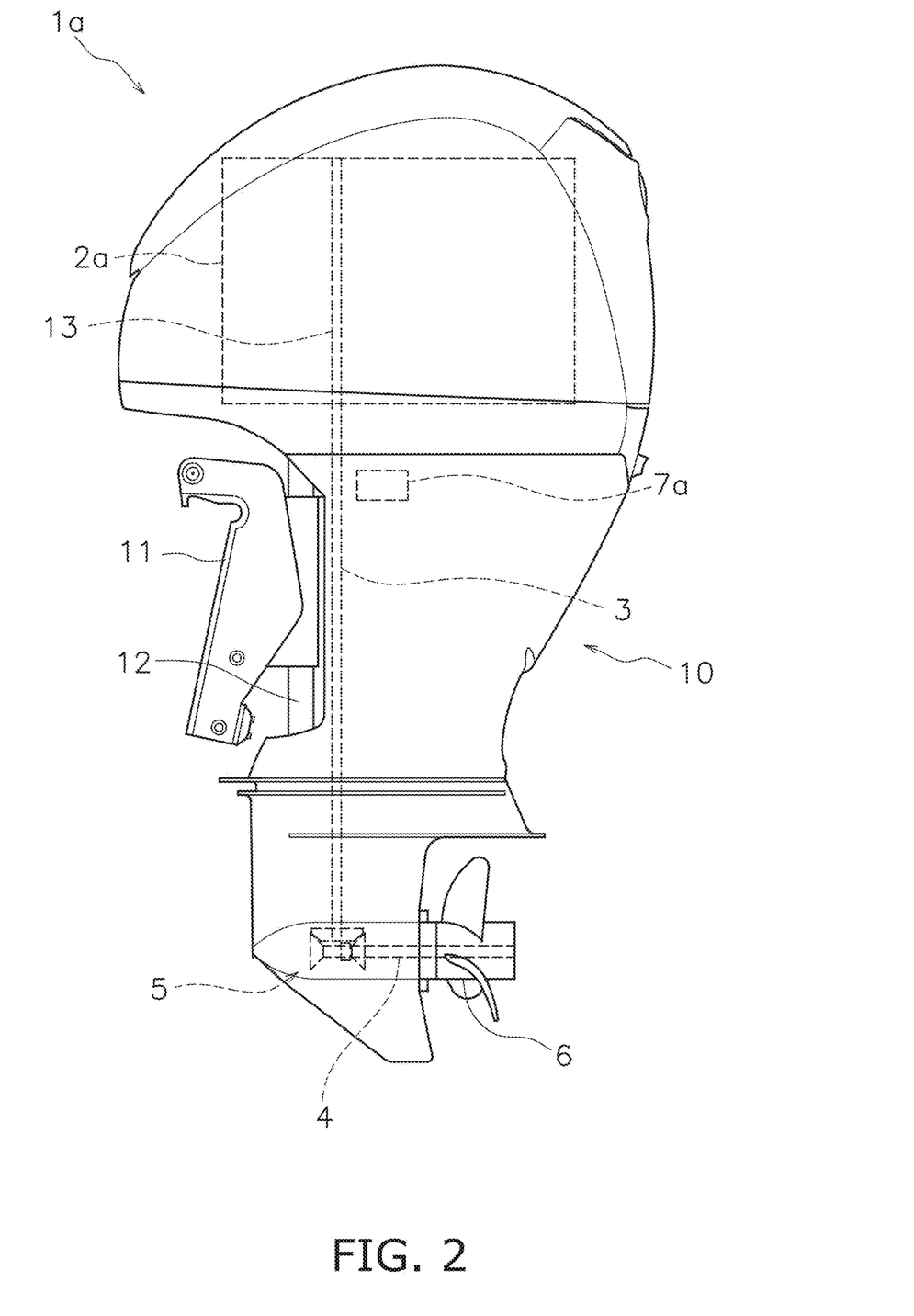
FIG. 2 is a side view of a marine propulsion device.

FIG. 2 is a side view of the first marine propulsion device 1a. The first marine propulsion device 1a is attached to the watercraft 100 via a bracket 11. The bracket 11 rotatably supports the first marine propulsion device 1a around a steering shaft 12. The steering shaft 12 extends in the vertical direction of the first marine propulsion device 1a.

The first marine propulsion device 1a includes a first engine 2a, a drive shaft 3, a propeller shaft 4, a shift mechanism 5, a first generator 7a, and a housing 10. The first engine 2a generates a thrust to propel the watercraft 100. The first engine 2a includes a crankshaft 13. The crankshaft 13 extends in the vertical direction of the first marine propulsion device 1a. The drive shaft 3 is connected to the crankshaft 13. The drive shaft 3 extends in the vertical direction of the first marine propulsion device 1a. The first generator 7a generates electric power by being driven by the first engine 2a. The first generator 7a is connected to the drive shaft 3 via, for example, a gear mechanism. Alternatively, the first generator 7a may be connected to the crankshaft 13.

The propeller shaft 4 extends in the front-rear direction of the first marine propulsion device 1a. The propeller shaft 4 is connected to the drive shaft 3 via the shift mechanism 5. A propeller 6 is attached to the propeller shaft 4. The shift mechanism 5 includes, for example, a gear and a clutch. The shift mechanism 5 is switched between a forward state, a reverse state, and a neutral state. In the forward state, the shift mechanism 5 transmits rotation from the drive shaft 3 to the propeller shaft 4 in the direction in which the watercraft 100 moves forward. In the reverse state, the shift mechanism 5 transmits rotation from the drive shaft 3 to the propeller shaft 4 in the direction in which the watercraft 100 moves backward. The housing 10 houses the first engine 2a, the drive shaft 3, the propeller shaft 4, and the shift mechanism 5.

The second marine propulsion device 1b and the third marine propulsion device 1c have the same configuration as the first marine propulsion device 1a. As illustrated in FIG. 1, the second marine propulsion device 1b includes a second engine 2b and a second generator 7b. The third marine propulsion device 1c includes a third engine 2c and a third generator 7c.

The watercraft 100 is equipped with an electric device 200 and a power supply system 300. The electric device 200 may include, for example, a computer to control the watercraft 100. The electric device 200 may include equipment such as a lighting system, an air conditioner, or a display. The power supply system 300 controls the electric power supplied to the electric device 200 and the first to third marine propulsion devices 1a to 1c. The power supply system 300 includes a first engine battery 21, a second engine battery 22, a power supply battery 23, and a battery management device 24. The electric device 200 and the first to third marine propulsion devices 1a to 1c are connected to the first engine battery 21, the second engine battery 22, and the power supply battery 23 via the battery management device 24.

Figure 3:
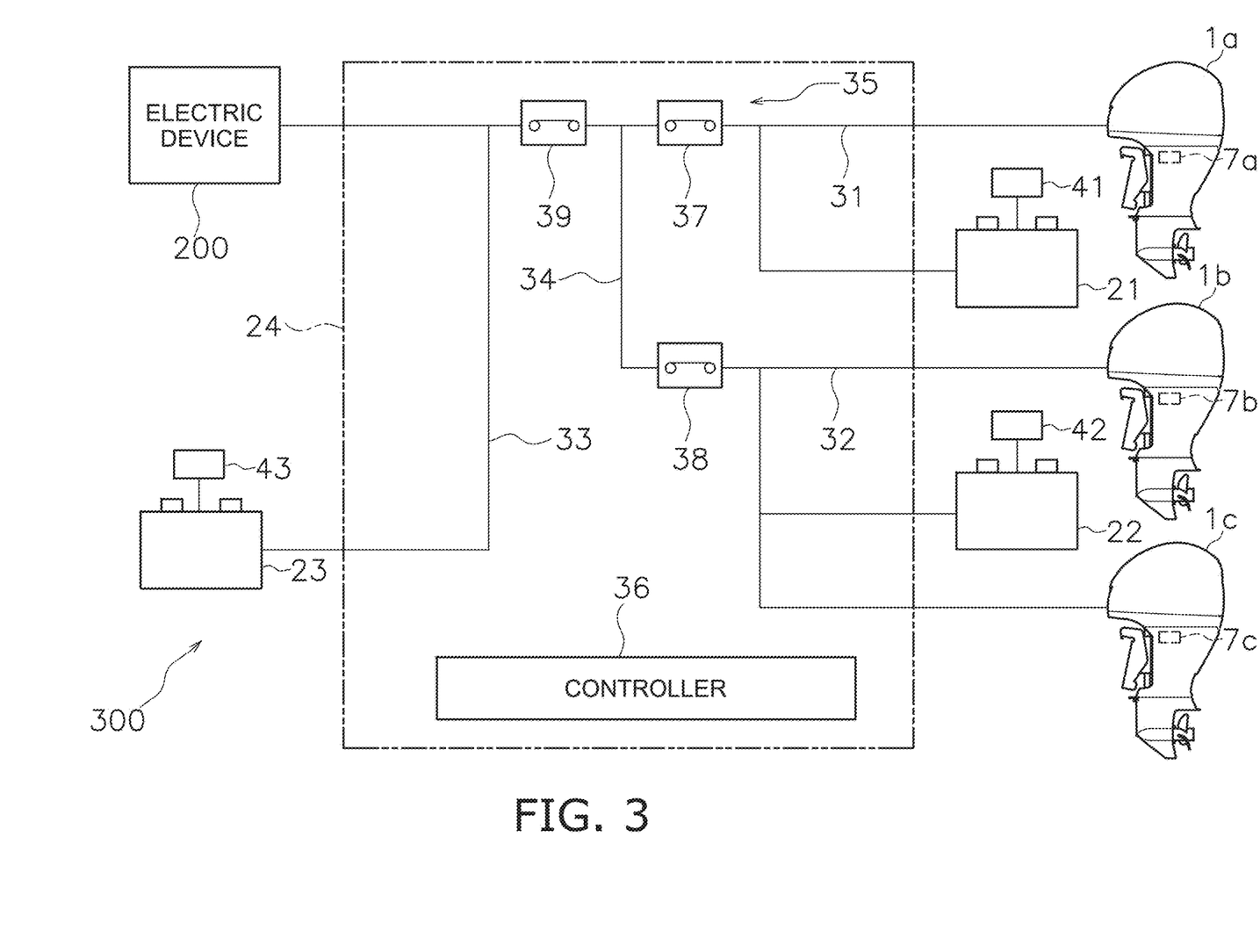
FIG. 3 is a schematic diagram showing a configuration of the power supply system.

FIG. 3 is a schematic view showing a configuration of the power supply system 300. As illustrated in FIG. 3, the battery management device 24 includes a first electric circuit 31, a second electric circuit 32, a third electric circuit 33, a connection circuit 34, a switch device 35, and a controller 36. The first electric circuit 31 connects the first engine battery 21 and the first marine propulsion device 1a. The first engine battery 21 supplies the electric power to the first engine 2a and is charged by the first generator 7a. The electric power from the first engine battery 21 is supplied to, for example, an ignition device and a starter motor of the first engine 2a.

The second electric circuit 32 connects the second engine battery 22 and the second marine propulsion device 1b. Further, the second electric circuit 32 connects the second engine battery 22 and the third marine propulsion device 1c. The second engine battery 22 supplies the electric power to the second engine 2b and is charged by the second generator 7b. The second engine battery 22 supplies the electric power to the third engine 2c and is charged by the third generator 7c. The electric power from the second engine battery 22 is supplied to, for example, ignition devices and starter motors of the second engine 2b and the third engine 2c.

The third electric circuit 33 connects the power supply battery 23 and the electric device 200. The power supply battery 23 supplies the electric power to the electric device 200. The connection circuit 34 is connected to the first to third connection circuits 31 to 34 via the switch device 35. The switch device 35 switches an electrical connection state between the first electric circuit 31, the second electric circuit 32, and the third electric circuit 33. The switch device 35 includes a first switch 37, a second switch 38, and a third switch 39. The first to third switches 37 to 39 are, for example, solenoid relays. The first to third switches 37 to 39 are connected to the controller 36. The first to third switches 37 to 39 are switched between a closed state and an open state, respectively, according to a signal from the controller 36.

The first switch 37 is arranged between the first electric circuit 31 and the connection circuit 34. The first switch 37 connects the first electric circuit 31 to the connection circuit 34 in the closed state. The first switch 37 disconnects the first electric circuit 31 from the connection circuit 34 in the open state. The second switch 38 is arranged between the second electric circuit 32 and the connection circuit 34. The second switch 38 connects the second electric circuit 32 to the connection circuit 34 in the closed state. The second switch 38 disconnects the second electric circuit 32 from the connection circuit 34 in the open state. The third switch 39 is arranged between the third electric circuit 33 and the connection circuit 34. The third switch 39 connects the third electric circuit 33 to the connection circuit 34 in the closed state. The third switch 39 disconnects the third electric circuit 33 from the connection circuit 34 in the open state.

The controller 36 transmits a signal to the switch device 35 to control the switch device 35. The controller 36 includes, for example, a computer that includes a processor and a memory. The controller 36 controls the switch device 35 to switch the electrical connection state between the first electric circuit 31, the second electric circuit 32, and the third electric circuit 33 into a plurality of states.

The power supply system 300 includes a first sensor 41, a second sensor 42, and a third sensor 43. The first sensor 41 is connected to the first engine battery 21. The first sensor 41 detects a first remaining battery power that indicates a remaining electric power of the first engine battery 21. The second sensor 42 is connected to the second engine battery 22. The second sensor 42 detects a second remaining battery power that indicates a remaining electric power of the second engine battery 22. The third sensor 43 is connected to the power supply battery 23. The third sensor 43 detects a supply remaining battery power that indicates a remaining electric power of the power supply battery 23.

The remaining battery power is indicated by SOC (State Of Charge). SOC defines a fully charged state as 100% and a fully discharged state as 0%. Each of the sensors 41 to 43 detects the voltage and the current of each of the batteries 21 to 23, and transmits a signal indicating the voltage and the current to the controller 36. The controller 36 calculates the first remaining battery power based on the signal from the first sensor 41. The controller 36 calculates the second remaining battery power based on the signal from the second sensor 42. The controller 36 calculates the supply remaining battery power based on the signal from the third sensor 43.

Figure 4:
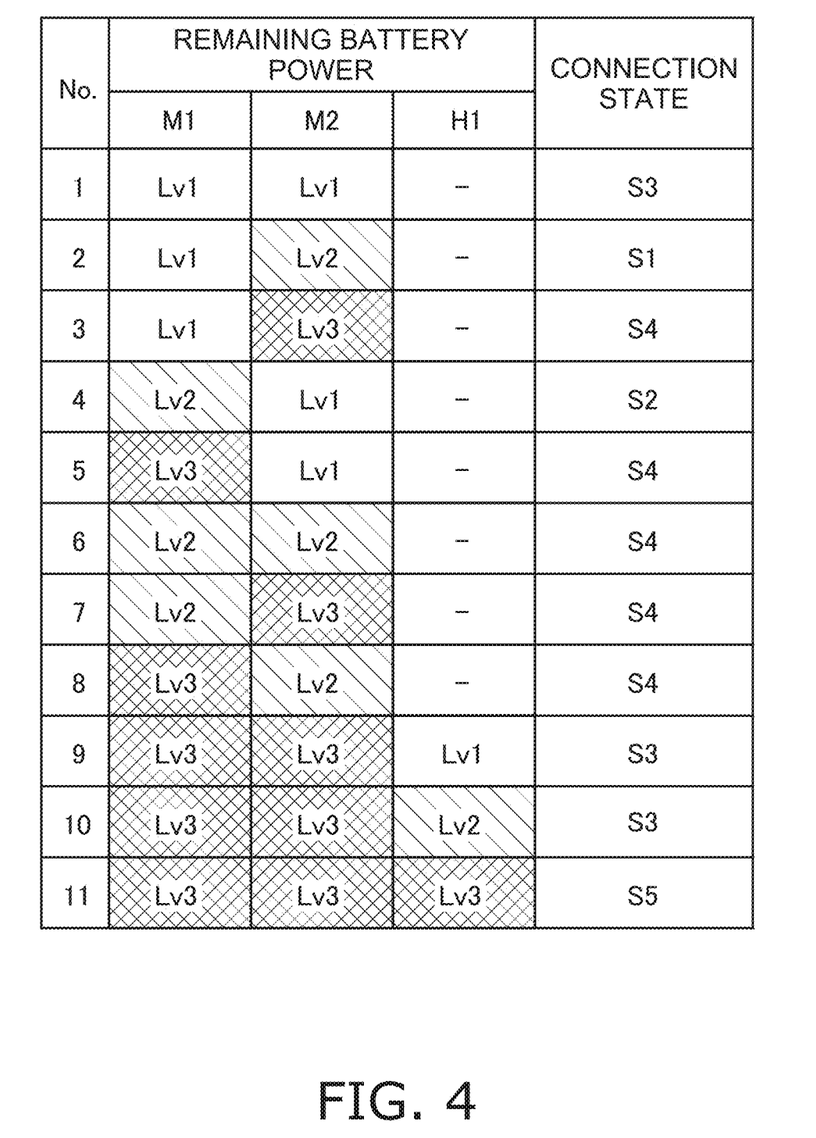
FIG. 4 is a table showing an example of battery management data.

The controller 36 switches an electrical connection state into a plurality of states between the first electric circuit 31, the second electric circuit 32, and the third electric circuit 33 according to the first remaining battery power, the second remaining battery power, and the supply remaining battery power. The controller 36 refers to battery management data and determines one of the plurality of states as the connection state. The battery management data defines the relationship between each of the remaining battery powers and the connection state. FIG. 4 is a table showing an example of the battery management data. As illustrated in FIG. 4, the plurality of states of the connection state include the first to fifth states S1 to S5.

Figure 5:
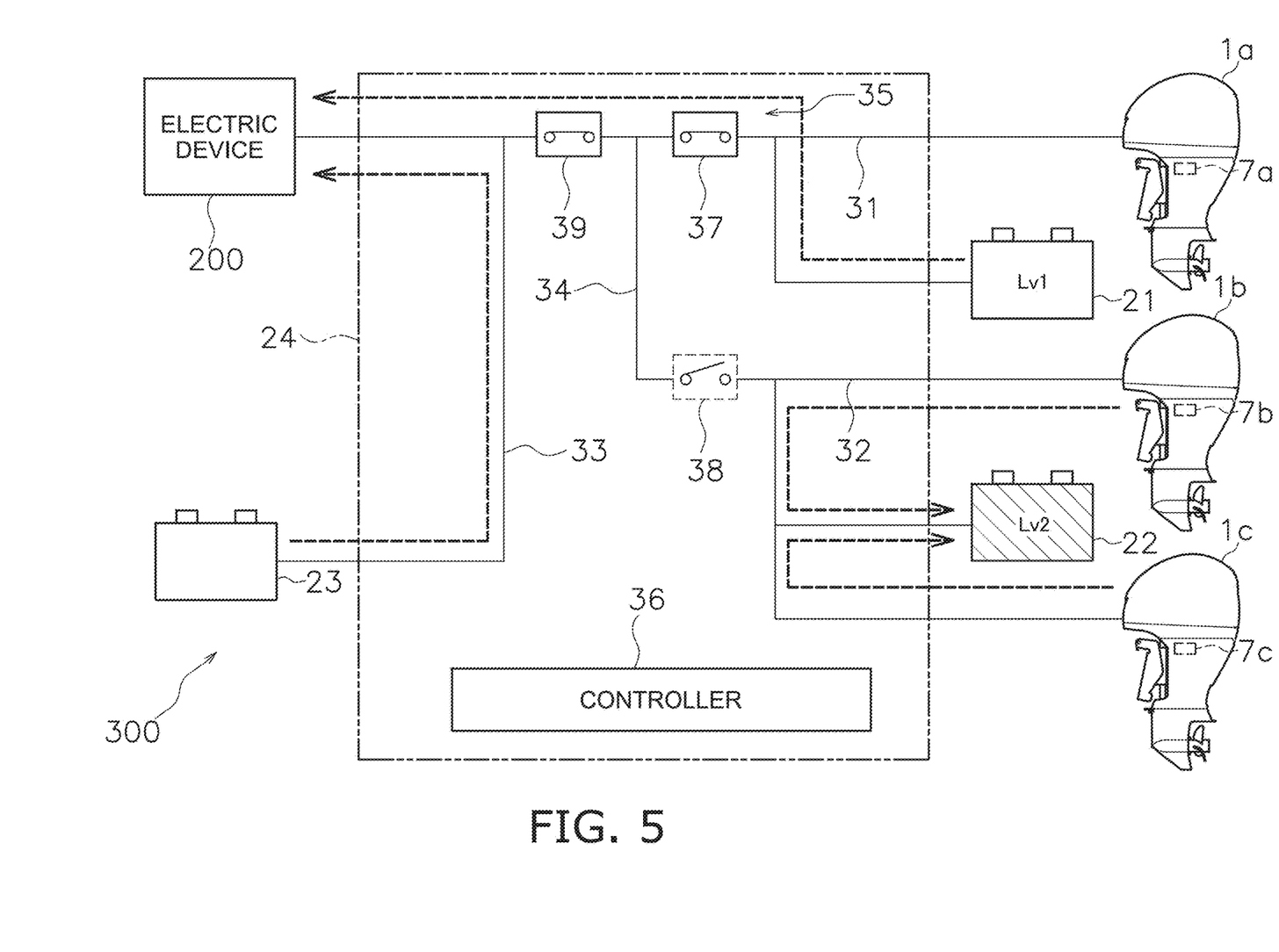
FIG. 5 is a diagram showing the power supply system when the connection state is a first state.

FIG. 5 shows the power supply system 300 when the connection state is the first state S1. As illustrated in FIG. 5, in the first state S1, the first switch 37 and the third switch 39 are in the closed state, and the second switch 38 is in the open state. Therefore, in the first state S1, the first electric circuit 31 is connected to the third electric circuit 33, and the second electric circuit 32 is disconnected from the third electric circuit 33.

Figure 6:
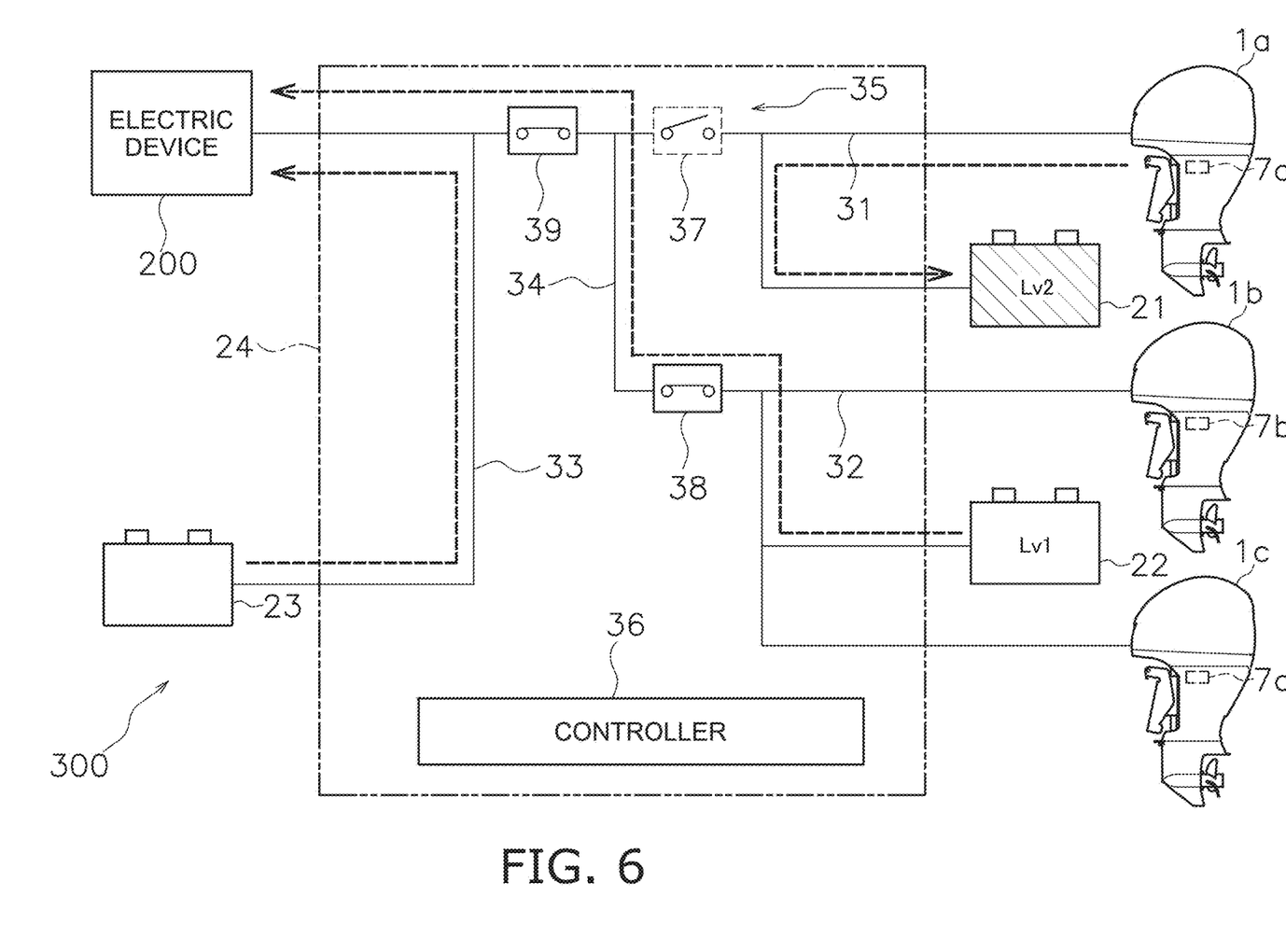
FIG. 6 is a diagram showing the power supply system when the connection state is a second state.

FIG. 6 shows the power supply system 300 when the connection state is the second state S2. As illustrated in FIG. 6, in the second state S2, the second switch 38 and the third switch 39 are in the closed state, and the first switch 37 is in the open state. Therefore, in the second state S2, the second electric circuit 32 is connected to the third electric circuit 33, and the first electric circuit 31 is disconnected from the third electric circuit 33.

Figure 7:
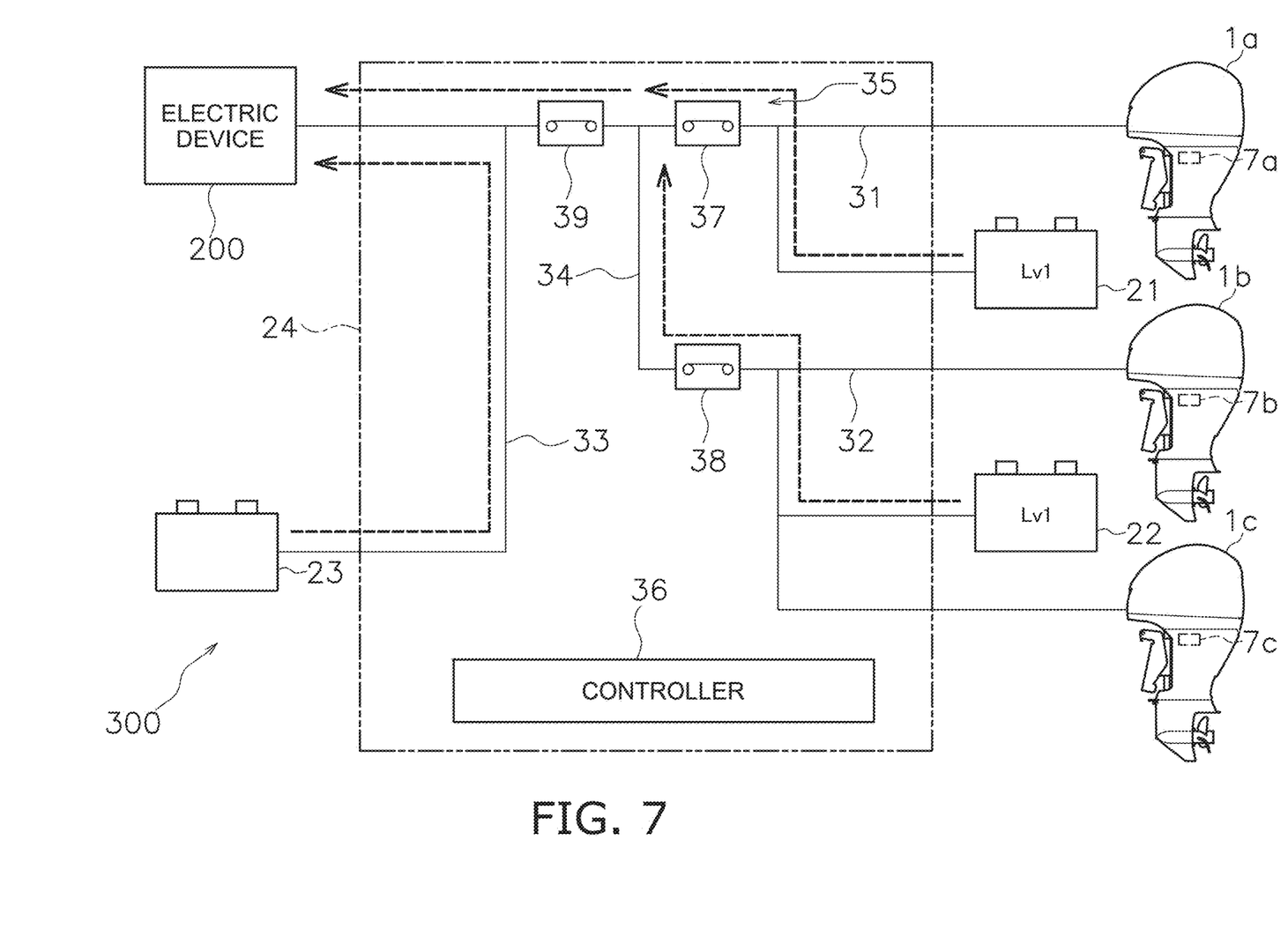
FIG. 7 is a diagram showing the power supply system when the connection state is a third state.
Figure 11:
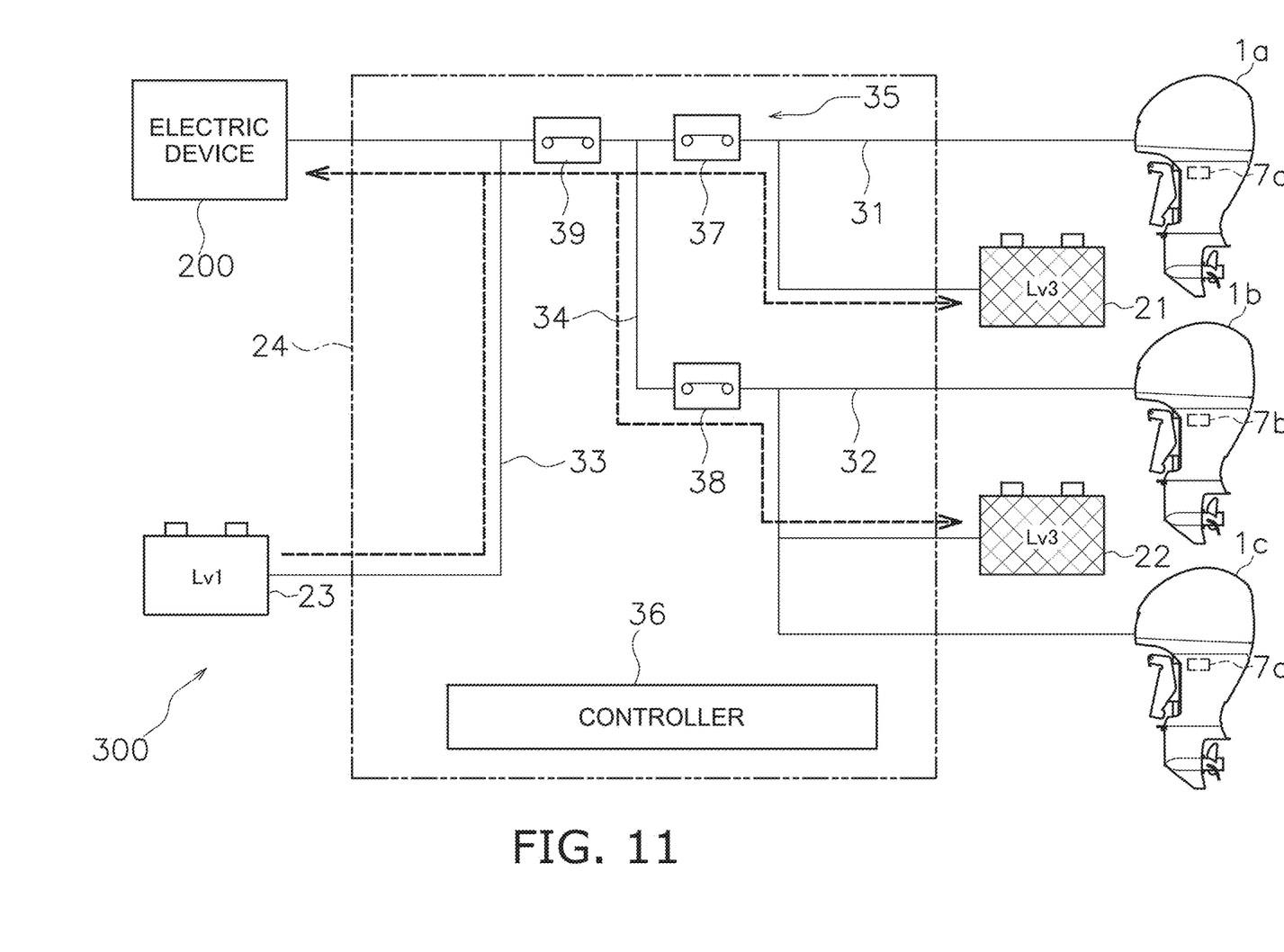
FIG. 11 is a diagram showing the power supply system when the connection state is the third state.

FIGS. 7 and 11 show the power supply system 300 when the connection state is the third state S3. As illustrated in FIGS. 7 and 11, in the third state S3, the first to third switches 37 to 39 are in the closed state. Therefore, in the third state S3, both the first electric circuit 31 and the second electric circuit 32 are connected to the third electric circuit 33.

Figure 8:
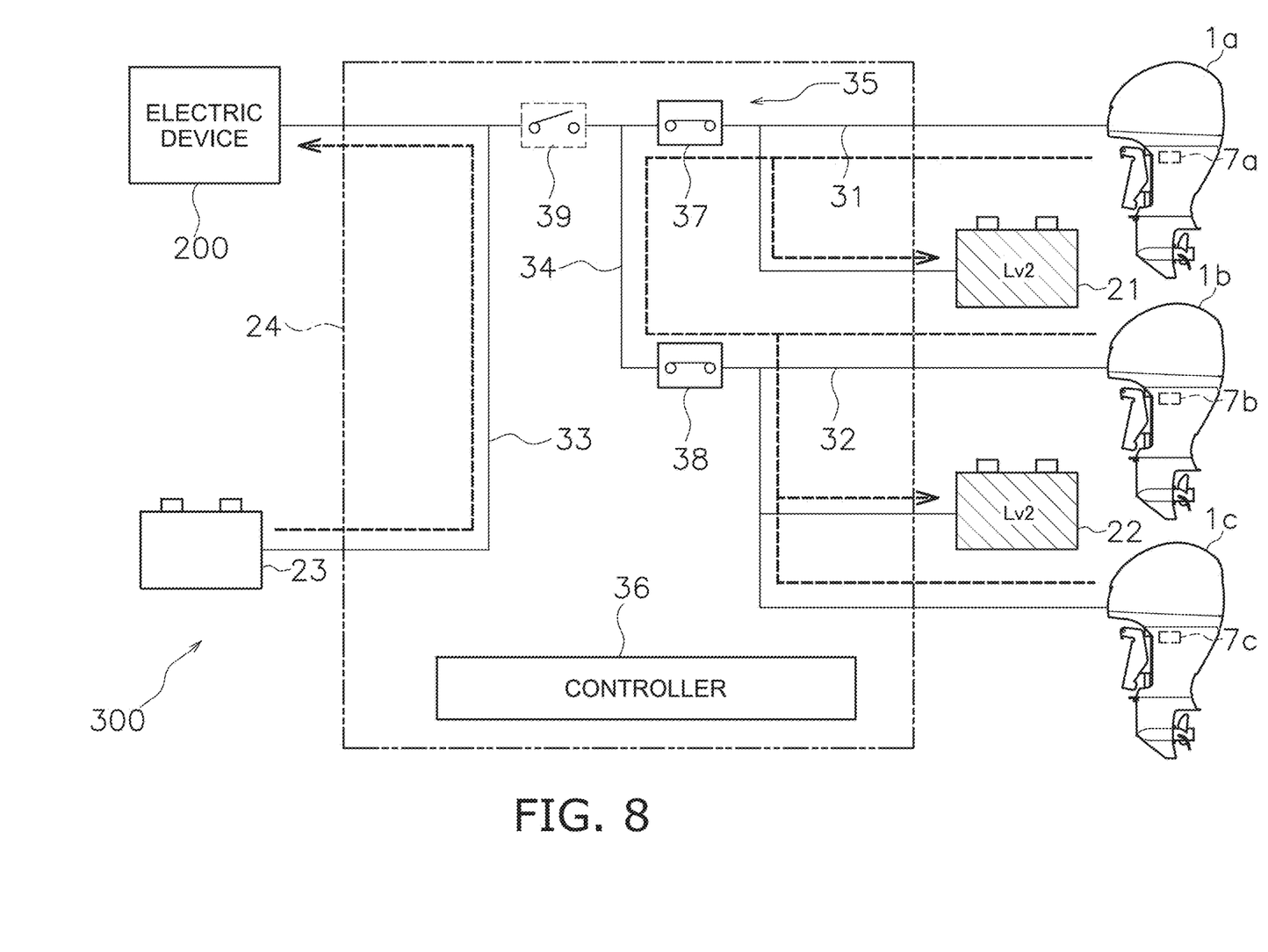
FIG. 8 is a diagram showing the power supply system when the connection state is a fourth state.
Figure 9:
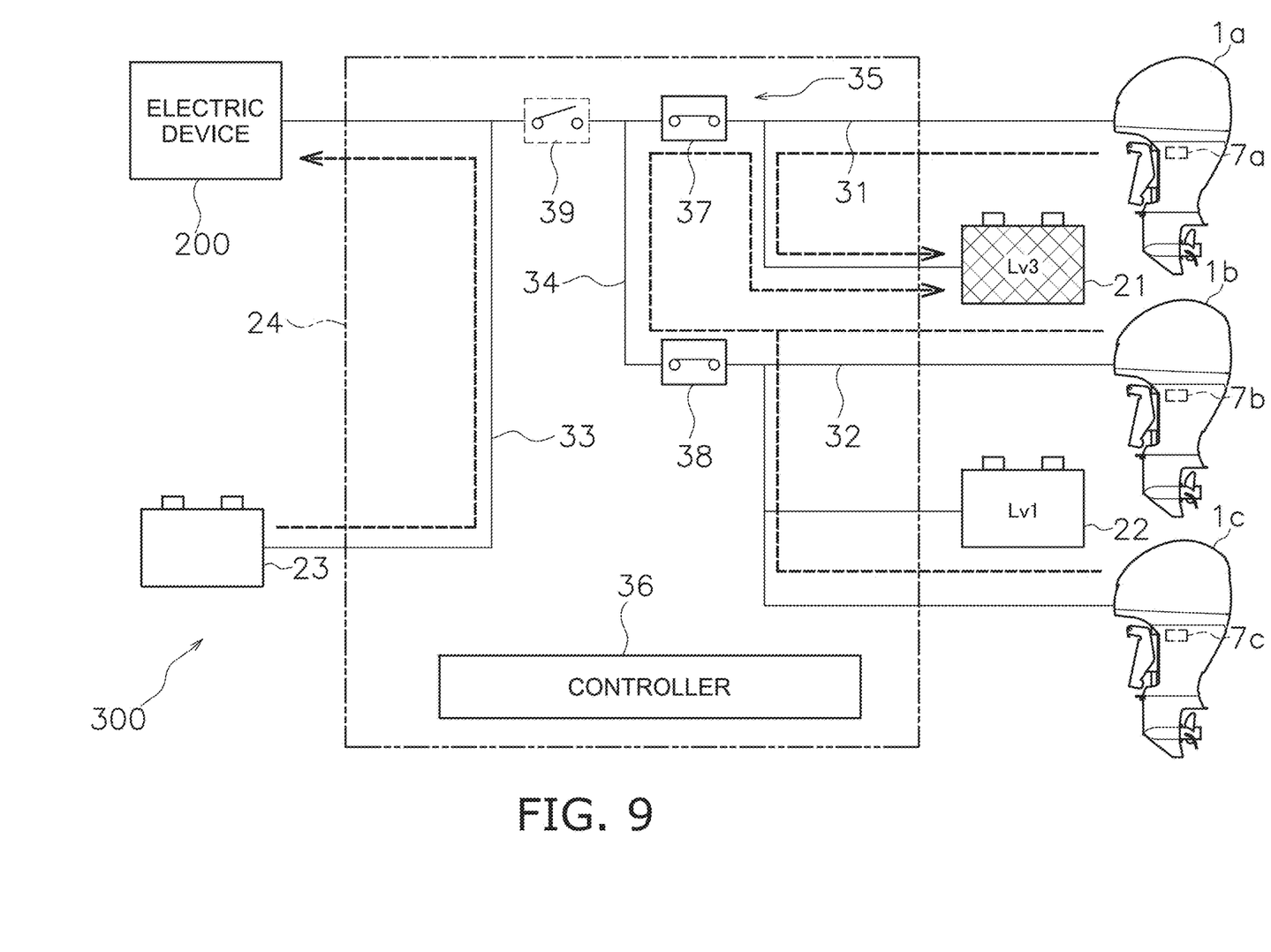
FIG. 9 is a diagram showing the power supply system when the connection state is the fourth state.
Figure 10:
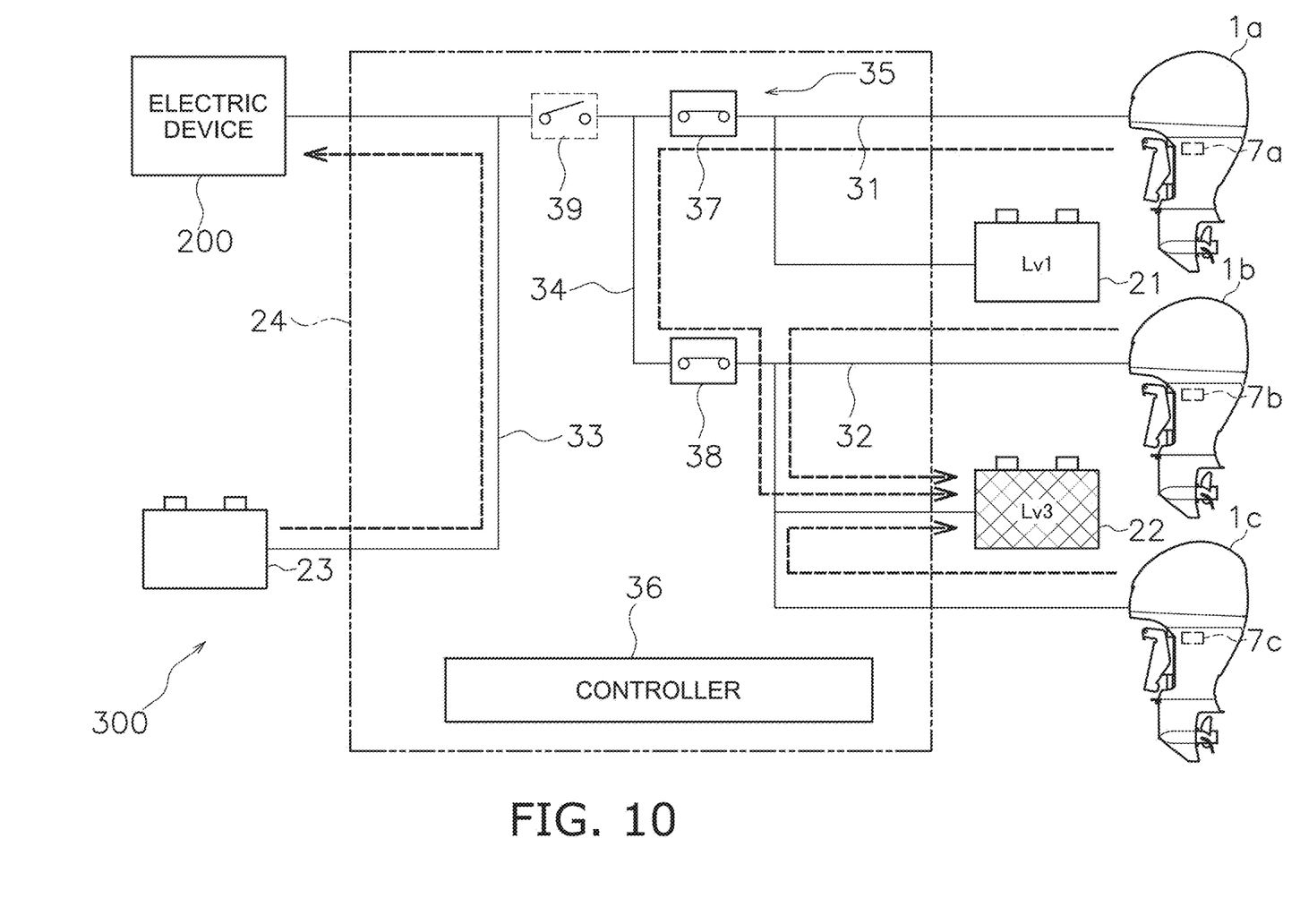
FIG. 10 is a diagram showing the power supply system when the connection state is the fourth state.

FIGS. 8 to 10 show the power supply system 300 when the connection state is the fourth state S4. As illustrated in FIGS. 8 to 10, in the fourth state S4, the first switch 37 and the second switch 38 are in the closed state, and the third switch 39 is in the open state. Therefore, in the fourth state S4, the first electric circuit 31 and the second electric circuit 32 are disconnected from the third electric circuit 33, and the first electric circuit 31 and the second electric circuit 32 are connected to each other.

Figure 12:
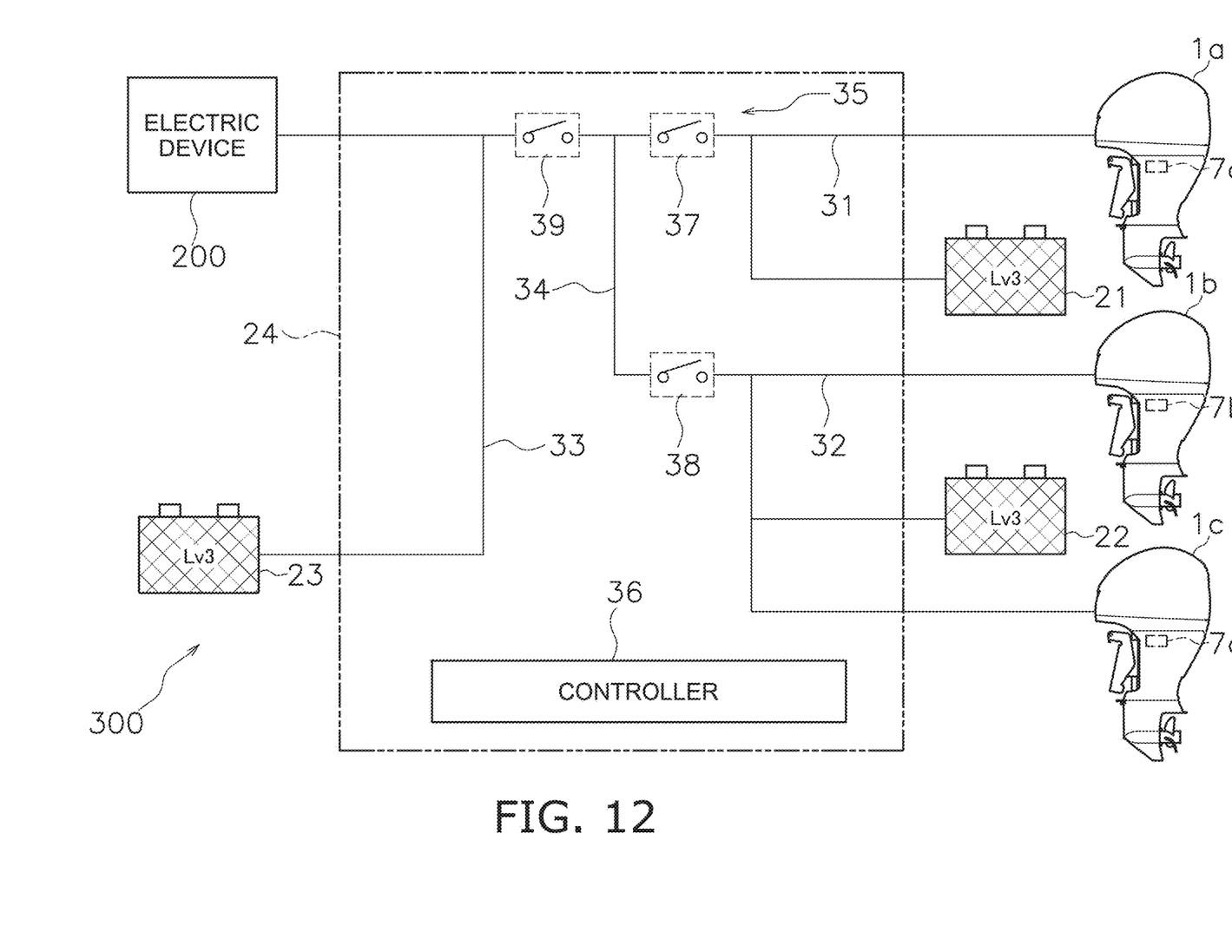
FIG. 12 is a diagram showing the power supply system when the connection state is a fifth state.

FIG. 12 shows the power supply system 300 when the connection state is the fifth state S5. As illustrated in FIG. 12, in the fifth state S5, the first to third switches 37 to 39 are in the open state. Therefore, in the fifth state S5, the first electric circuit 31, the second electric circuit 32, and the third electric circuit 33 are disconnected from each other.

The controller 36 classifies the first remaining battery power, the second remaining battery power, and the supply remaining battery power into a plurality of levels and evaluates them. As illustrated in FIG. 4, the controller 36 classifies the first remaining battery power M1, the second remaining battery power M2, and the supply remaining battery power H1 into the first to third levels Lv1 to Lv3. The first level Lv1 indicates that the battery power is sufficient. The remaining battery power of the second level Lv2 is less than the remaining battery power of the first level Lv1. The remaining battery power of the third level Lv3 is less than the remaining battery power of the second level Lv2. The remaining battery power of the third level Lv3 indicates that there is almost no remaining battery power. Alternatively, the remaining battery power of the third level Lv3 may be a lower limit value of the remaining battery power desirable for maintaining the life of the battery for a long time.

The controller 36 switches the connection state to the third state S3 when the first remaining battery power M1 and the second remaining battery power M2 are the first level Lv1 (battery management data No. 1). As a result, as illustrated in FIG. 7, the first electric circuit 31 and the second electric circuit 32 are connected to the third electric circuit 33. As a result, the electric power is supplied to the electric device 200 from the first engine battery 21 and the second engine battery 22.

The controller 36 switches the connection state to the first state S1 when the first remaining battery power M1 is the first level Lv1 and the second remaining battery power M2 is the second level Lv2 (battery management data No. 2). As a result, as illustrated in FIG. 5, the first electric circuit 31 is connected to the third electric circuit 33, and the second electric circuit 32 is disconnected from the third electric circuit 33. As a result, the electric power is supplied from the first engine battery 21 to the electric device 200. Further, the second engine battery 22 is charged by the second generator 7b and the third generator 7c.

The controller 36 switches the connection state to the fourth state S4 when the first remaining battery power M1 is the first level Lv1 and the second remaining battery power M2 is the third level Lv3 (battery management data No. 3). As a result, as illustrated in FIG. 10, the first electric circuit 31 and the second electric circuit 32 are disconnected from the third electric circuit 33, and the first electric circuit 31 and the second electric circuit 32 are connected to each other. As a result, the second engine battery 22 is charged by the first generator 7a, the second generator 7b, and the third generator 7c. Further, the electric power is supplied to the electric device 200 from the power supply battery 23.

The controller 36 switches the connection state to the second state S2 when the first remaining battery power M1 is the second level Lv2 and the second remaining battery power M2 is the first level Lv1 (battery management data No. 4). As a result, as illustrated in FIG. 6, the second electric circuit 32 is connected to the third electric circuit 33, and the first electric circuit 31 is disconnected from the third electric circuit 33. As a result, the electric power is supplied from the second engine battery 22 to the electric device 200. Further, the first engine battery 21 is charged by the first generator 7a.

The controller 36 switches the connection state to the fourth state S4 when the first remaining battery power M1 is the third level Lv3 and the second remaining battery power M2 is the first level Lv1 (battery management data No. 5). As a result, as illustrated in FIG. 9, the first electric circuit 31 and the second electric circuit 32 are disconnected from the third electric circuit 33, and the first electric circuit 31 and the second electric circuit 32 are connected to each other. As a result, the first engine battery 21 is charged by the first generator 7a, the second generator 7b, and the third generator 7c.

The controller 36 switches the connection state to the fourth state S4 when the first remaining battery power M1 and the second remaining battery power M2 are the second level Lv2 (battery management data No. 6). As a result, as illustrated in FIG. 8, the first electric circuit 31 and the second electric circuit 32 are disconnected from the third electric circuit 33, and the first electric circuit 31 and the second electric circuit 32 are connected to each other. As a result, the first engine battery 21 and the second engine battery 22 are charged by the first generator 7a, the second generator 7b, and the third generator 7c. Further, the electric power is supplied to the electric device 200 from the power supply battery 23.

The controller 36 switches the connection state to the fourth state S4 when the first remaining battery power M1 is the second level Lv2 and the second remaining battery power M2 is the third level Lv3 (battery management data No. 7). The controller 36 switches the connection state to the fourth state S4 when the first remaining battery power M1 is the third level Lv3 and the second remaining battery power M2 is the second level Lv2 (battery management data No. 8). As a result, similarly to FIG. 8, the first engine battery 21 and the second engine battery 22 are charged by the first generator 7a, the second generator 7b, and the third generator 7c. Further, the electric power is supplied to the electric device 200 from the power supply battery 23.

When the first remaining battery power M1 and the second remaining battery power M2 are both at the third level Lv3, the controller 36 switches the connection state according to the supply remaining battery power H1. Specifically, when the first remaining battery power M1 and the second remaining battery power M2 are the third level Lv3 and the supply remaining battery power H1 is the first level Lv1, the controller 36 switches the connection state to the third state S3 (battery management data No. 9). As a result, as illustrated in FIG. 11, the first electric circuit 31 and the second electric circuit 32 are connected to the third electric circuit 33. As a result, the electric power from the power supply battery 23 assists the first engine battery 21 and the second engine battery 22. Although not illustrated, the first engine battery 21 and the second engine battery 22 are charged by the first generator 7a, the second generator 7b, and the third generator 7c. The controller 36 switches the connection state to the third state S3 when the first remaining battery power M1 and the second remaining battery power M2 are the third level Lv3 and the supply remaining battery power H1 is the second level Lv2 (battery management data No. 10). As a result, similarly to FIG. 11, the electric power from the power supply battery 23 assists the first engine battery 21 and the second engine battery 22.

When the first remaining battery power M1, the second remaining battery power M2, and the supply remaining battery power H1 are the third level Lv3, the controller 36 switches the connection state to the fifth state S5 (battery management data No. 11). As a result, as illustrated in FIG. 12, the first electric circuit 31, the second electric circuit 32, and the third electric circuit 33 are disconnected from each other.

In the power supply system 300 according to the preferred embodiments described above, in the first state S1, the controller 36 supplies the electric power from the first engine battery 21 to the electric device 200, and charges the second engine battery 22 by the second generator 7b. Further, in the second state S2, the controller 36 supplies the electric power from the second engine battery 22 to the electric device 200, and charges the first engine battery 21 by the first generator 7a. As a result, the electric device 200 is efficiently supplied with the electric power while preventing or significantly reducing battery exhaustion in the first and second engine batteries 21 and 22 for the marine propulsion device.

Although preferred embodiments of the present invention have been described above, the present invention is not limited to the above-described preferred embodiments, and various modifications can be made without departing from the gist of the present invention.

The marine propulsion devices are not limited to outboard motors, but may be other propulsion devices such as a sterndrive or a jet propulsion device. The structures of the marine propulsion devices are not limited to that of the above-described preferred embodiments, and may be changed. The number of marine propulsion devices is not limited to three. The number of marine propulsion devices may be two or more than three. The number of engine batteries is not limited to two and may be more than two.

The switching of the connection state by the battery management device 24 is not limited to that of the above-described preferred embodiments, and may be changed. For example, any of the first to fifth states S1 to S5 may be omitted. A state different from the first to fifth states S1 to S5 may be added.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed:

1. A power supply system for a watercraft including a first outboard motor including a first engine and a first generator driven by the first engine, a second outboard motor including a second engine and a second generator driven by the second engine, and an electric device, the power supply system comprising:
    a first engine battery to supply an electric power to the first engine and to be charged by the first generator;
    a second engine battery to supply an electric power to the second engine and to be charged by the second generator;
    a power supply battery to supply an electric power to the electric device;
    a first electric circuit to connect the first engine battery and the first outboard motor;
    a second electric circuit to connect the second engine battery and the second outboard motor;
    a third electric circuit to connect the power supply battery and the electric device;
    at least one switch to switch a connection state between the first electric circuit, the second electric circuit, and the third electric circuit; and
    a controller configured or programmed to:
        control the at least one switch to switch the connection state to a plurality of states including at least one of a first state and a second state;
        in the first state, connect the first electric circuit to the third electric circuit to supply the electric power from the first engine battery to the electric device, and disconnect the second electric circuit from the third electric circuit to charge the second engine battery by the second generator; and
        in the second state, connect the second electric circuit to the third electric circuit to supply the electric power from the second engine battery to the electric device, and disconnect the first electric circuit from the third electric circuit to charge the first engine battery by the first generator.

2. The power supply system according to claim 1, wherein the controller is further configured or programmed to switch the connection state to the plurality of states including the first state and the second state.

3. The power supply system according to claim 1, wherein the plurality of states include a third state; and
the controller is further configured or programmed to, in the third state, connect the first electric circuit and the second electric circuit to the third electric circuit to supply the electric power to the electric device from the first engine battery and the second engine battery.

4. The power supply system according to claim 1, wherein the plurality of states include a fourth state;
the controller is further configured or programmed to, in the fourth state, disconnect the first electric circuit and the second electric circuit from the third electric circuit, and connect the first electric circuit and the second electric circuit to each other to charge the first engine battery and/or the second engine battery by the first generator and the second generator.

5. The power supply system according to claim 1, wherein the plurality of states include a fifth state;
the controller is further configured or programmed to, in the fifth state, disconnect the first electric circuit, the second electric circuit, and the third electric circuit from each other.

6. The power supply system according to claim 1, further comprising:
    a first sensor to detect a first remaining battery power indicative of a remaining electric power of the first engine battery; and
    a second sensor to detect a second remaining battery power indicative of a remaining electric power of the second engine battery; wherein
    the controller is further configured or programmed to switch the connection state to the plurality of states according to the first remaining battery power and the second remaining battery power.

7. The power supply system according to claim 6, wherein the controller is further configured or programmed to:
    switch the connection state to the first state when the first remaining battery power is at a first level and the second remaining battery power is at a second level less than the first level; and
    switch the connection state to the second state when the first remaining battery power is at the second level and the second remaining battery power is at the first level.

8. The power supply system according to claim 7, wherein the plurality of states include a third state; and
the controller is further configured or programmed to:
    in the third state, connect the first electric circuit and the second electric circuit to the third electric circuit; and
    switch the connection state to the third state to supply the electric power to the electric device from the first engine battery and the second engine battery when the first remaining battery power and the second remaining battery power are at the first level.

9. The power supply system according to claim 7, wherein the plurality of states include a fourth state; and
the controller is further configured or programmed to:
    in the fourth state, disconnect the first electric circuit and the second electric circuit from the third electric circuit, and connect the first electric circuit and the second electric circuit to each other; and
    switch the connection state to the fourth state to charge the first engine battery and/or the second engine battery by the first generator and the second generator when the first remaining battery power or the second remaining battery power is at a third level lower than the second level.

10. The power supply system according to claim 9, further comprising:
    a third sensor to detects a supply remaining battery power indicative of a remaining electric power of the power supply battery; wherein
    the plurality of states include a third state; and
    the controller is further configured or programmed to:
        in the third state, connect the first electric circuit and the second electric circuit to the third electric circuit; and
        switch the connection state to the third state to assist the first engine battery and the second engine battery by the electric power from the power supply battery when the first remaining battery power and the second remaining battery power are at the third level, and the supply remaining battery power is at the first level or the second level.

11. The power supply system according to claim 10, wherein
the plurality of states include a fifth state; and
the controller is further configured or programmed to:
in the fifth state, disconnect the first electric circuit, the second electric circuit, and the third electric circuit from each other; and
switch the connection state to the fifth state when the first remaining battery power, the second remaining battery power, and the supply remaining battery power are at the third level.

12. A power supply system for a watercraft including a first marine propulsion device including a first engine and a first generator driven by the first engine, a second marine propulsion device including a second engine and a second generator driven by the second engine, and an electric device, the power supply system comprising:
a first engine battery to supply an electric power to the first engine and to be charged by the first generator;
a second engine battery to supply an electric power to the second engine and to be charged by the second generator;
a power supply battery to supply an electric power to the electric device;
a first electric circuit to connect the first engine battery and the first marine propulsion device;
a second electric circuit to connect the second engine battery and the second marine propulsion device;
a third electric circuit to connect the power supply battery and the electric device;
at least one switch to switch a connection state between the first electric circuit, the second electric circuit, and the third electric circuit; and
a controller configured or programmed to:
control the at least one switch to switch the connection state to a plurality of states including at least one of a first state and a second state;
in the first state, connect the first electric circuit to the third electric circuit to supply the electric power from the first engine battery to the electric device, and disconnect the second electric circuit from the third electric circuit to charge the second engine battery by the second generator; and
in the second state, connect the second electric circuit to the third electric circuit to supply the electric power from the second engine battery to the electric device, and disconnect the first electric circuit from the third electric circuit to charge the first engine battery by the first generator.

13. The power supply system according to claim 12, wherein the controller is further configured or programmed to switch the connection state to the plurality of states including the first state and the second state.

14. The power supply system according to claim 12, wherein
the plurality of states include a third state; and
the controller is further configured or programmed to, in the third state, connect the first electric circuit and the second electric circuit to the third electric circuit to supply the electric power to the electric device from the first engine battery and the second engine battery.

15. The power supply system according to claim 12, wherein
the plurality of states include a fourth state; and
the controller is further configured or programmed to, in the fourth state, disconnect the first electric circuit and the second electric circuit from the third electric circuit, and connect the first electric circuit and the second electric circuit to each other to charge the first engine battery and/or the second engine battery by the first generator and the second generator.

16. The power supply system according to claim 12, wherein
the plurality of states include a fifth state; and
the controller is further configured or programmed to, in the fifth state, disconnect the first electric circuit, the second electric circuit, and the third electric circuit from each other.

17. The power supply system according to claim 12 further comprising:
a first sensor to detect a first remaining battery power indicative of a remaining electric power of the first engine battery; and
a second sensor to detect a second remaining battery power indicative of a remaining electric power of the second engine battery; wherein
the controller is further configured or programmed to switch the connection state to the plurality of states according to the first remaining battery power and the second remaining battery power.

18. The power supply system according to claim 17, wherein the controller is further configured or programmed to:
switch the connection state to the first state when the first remaining battery power is at a first level and the second remaining battery power is at a second level less than the first level; and
switch the connection state to the second state when the first remaining battery power is at the second level and the second remaining battery power is at the first level.

19. The power supply system according to claim 18, wherein
the plurality of states include a third state; and
the controller is further configured or programmed to:
in the third state, connect the first electric circuit and the second electric circuit to the third electric circuit; and
switch the connection state to the third state to supply the electric power to the electric device from the first engine battery and the second engine battery when the first remaining battery power and the second remaining battery power are at the first level.

20. The power supply system according to claim 18, wherein
the plurality of states include a fourth state; and
the controller is further configured or programmed to:
in the fourth state, disconnect the first electric circuit and the second electric circuit from the third electric circuit, and connect the first electric circuit and the second electric circuit to each other; and
switch the connection state to the fourth state to charge the first engine battery and/or the second engine battery by the first generator and the second generator when the first remaining battery power or the second remaining battery power is at a third level lower than the second level.

* * * * *